UNITED STATES PATENT OFFICE.

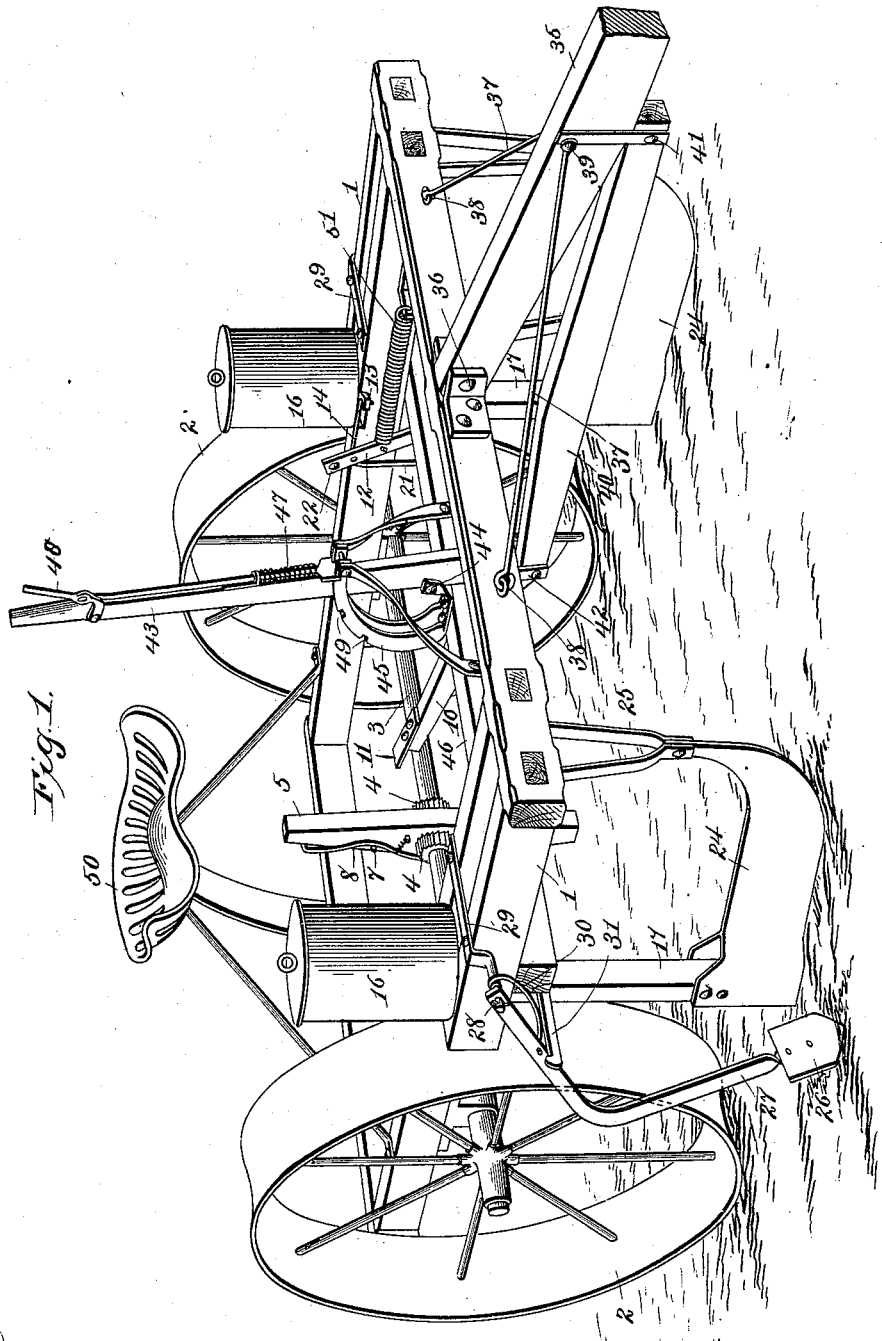

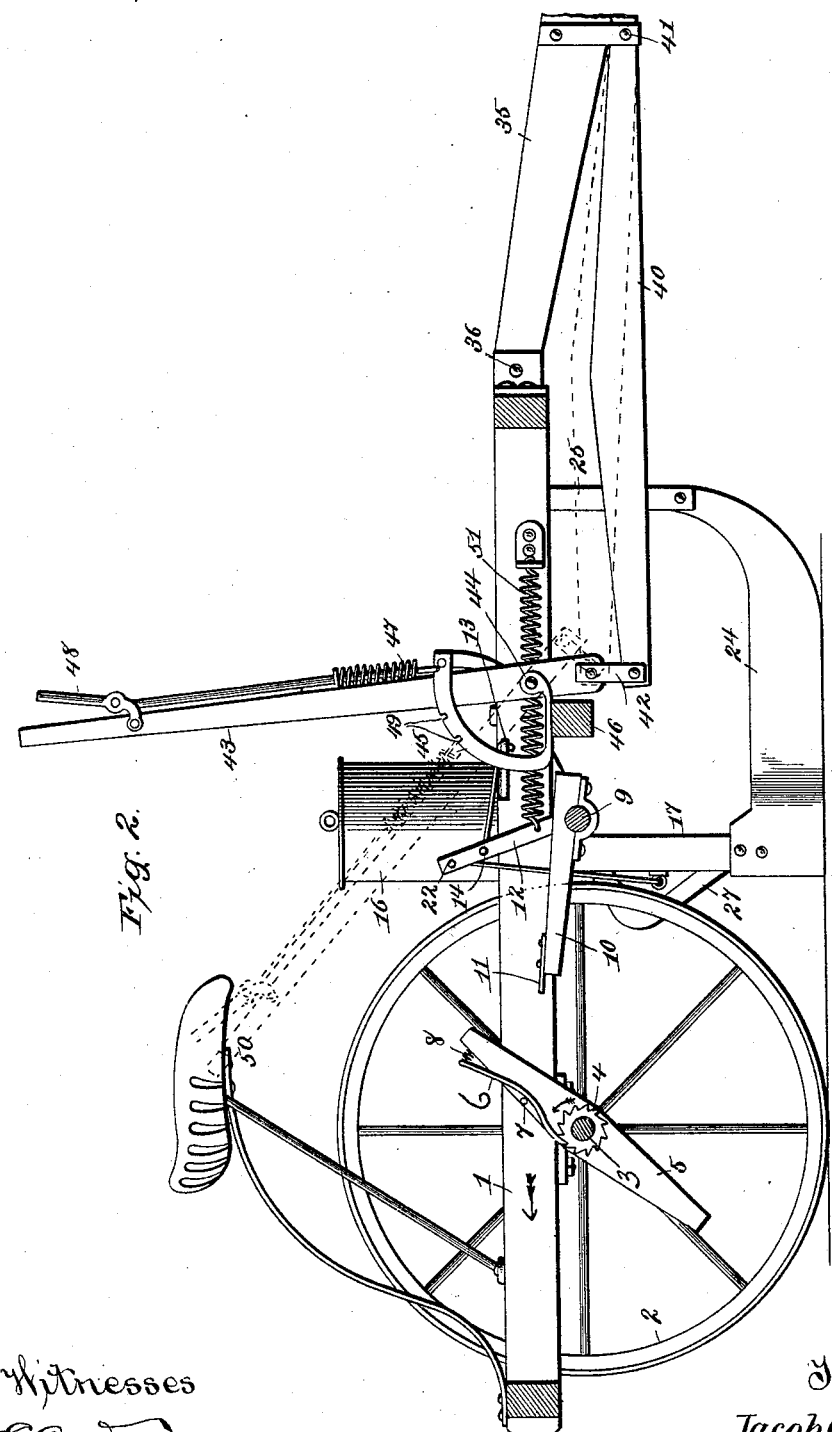

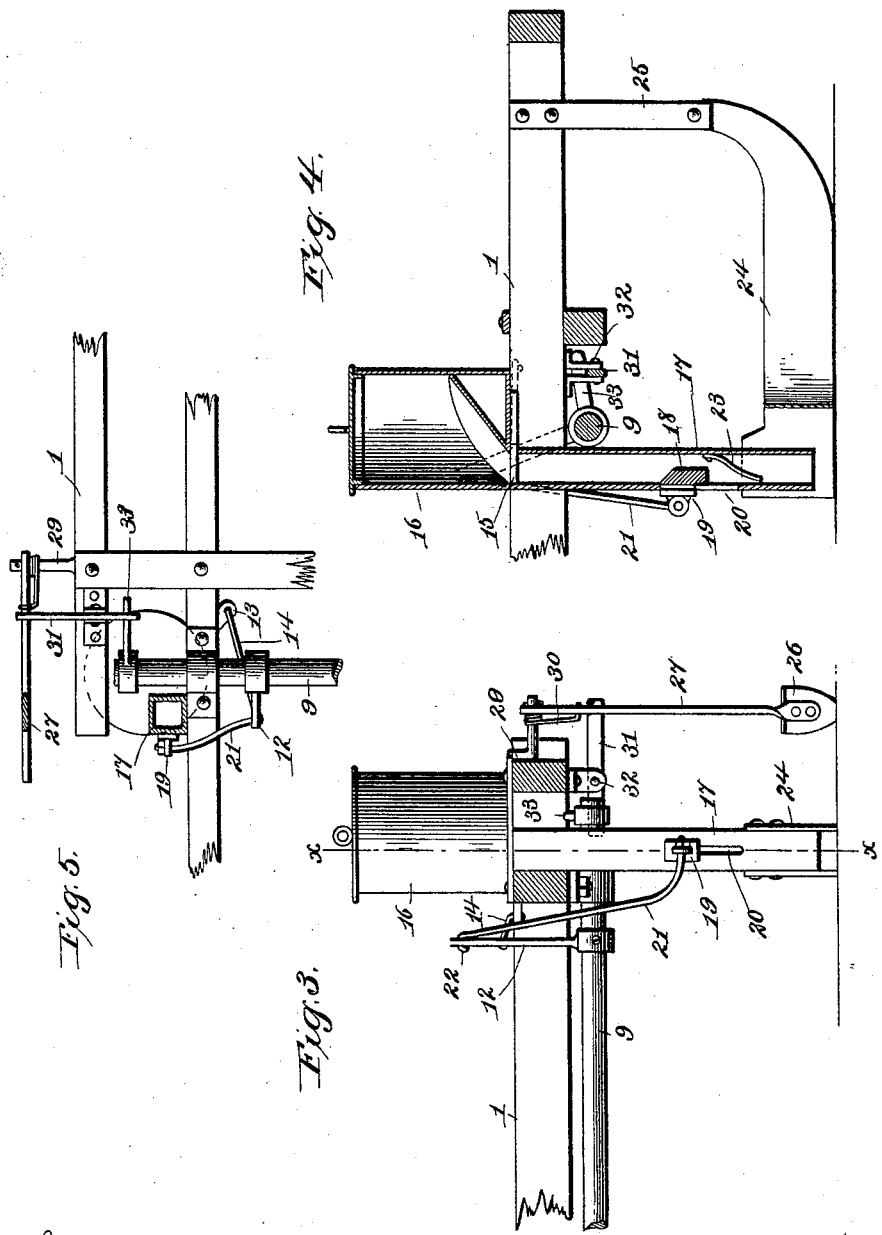

JACOB C. HAAS, OF BREMEN, INDIANA, ASSIGNOR OF ONE-HALF TO JOHN HENRY KOONTZ, OF CULVER CITY, INDIANA.

SEED-PLANTER.

SPECIFICATION forming part of Letters Patent No. 585,096, dated June 22, 1897.

Application filed June 24, 1896. Serial No. 596,739. (No model.)

*To all whom it may concern:*

Be it known that I, JACOB C. HAAS, a citizen of the United States, residing at Bremen, county of Marshall, and State of Indiana, have invented certain new and useful Improvements in Seed-Planters, of which the following is a specification.

This invention relates to a new and useful improvement in seed-planters, and primarily has for its object to indicate the positions where the seed are inserted in the ground, in order that a perfect check-row system of planting may be had, and a further object of this invention is to provide means for elevating the front end of the planter, so as to lift the furrow-opener above the surface of the ground when it is desired to throw them out of action, and also to improve the construction and operation of the mechanisms for feeding the seed from the hoppers to the openers.

With these ends in view this invention consists in the details of construction and combination of elements hereinafter set forth and then specifically designated by the claims.

In order that those skilled in the art to which this invention appertains may understand how to make and use the same, I will describe its construction and operation in detail, referring to the accompanying drawings, forming a part of this specification, in which—

Figure 1 is a perspective of the planter in operation; Fig. 2, a central longitudinal section thereof; Fig. 3, a detailed cross-section of one of the side bars of the frame, showing one of the hoppers in elevation and illustrating the means of transmitting motion from the rock-shaft to the seed-dropper; and Fig. 4, a longitudinal section at the line $x$ $x$ of Fig. 3, showing the interior of the hopper and post. Fig. 5 is a plan view of the dropper-operating mechanism.

Referring to the details of the drawings, 1 represents the frame, which composes the truck of the machine, of such shape as to support the several operating parts thereof, and 2 are the truck-wheels rigidly mounted upon the shaft 3, which latter is journaled in suitable bearings in the truck. Upon the shaft, midway thereof, are secured two ratchet-wheels 4, which serve as collars to prevent the sidewise movement of the cam-bar 5, which is loosely journaled upon the shaft between these ratchets, so as to freely revolve in either direction. For the purpose of preventing this bar from revolving in one direction a double-pointed pawl 6 is pivoted thereto at 7, so as to engage the teeth of the ratchet, and is normally held in engagement therewith by the springs 8, for the purpose hereinafter set forth.

A rock-shaft 9 is journaled upon the under side of the truck forward of the drive-shaft 3, and has secured thereto an arm 10, extending rearward and having secured thereon a toe-piece 11, projecting within the field of travel of the two ends of the cam-bar, so that the latter during every revolution thereof will depress the arm 10 twice. Also secured upon the rock-shaft are the levers 12, having connected thereto the valve-stems 13 by means of the links 14, and these valve-stems have arranged thereon suitable valves 15, placed in the bottom of the feed-hopper 16 in such manner as to deliver the desired amount of grain to the interior of the posts 17, such hoppers, posts, and valves being of any desired construction and arrangement, but as they do not form an especial feature of this invention a detailed description thereof is not necessary.

Arranged within the posts are plungers 18, adapted to slide vertically therein and having lugs 19 projecting through the slots 20 in the rear side of said posts, and to these lugs are pivoted the rods 21, the upper ends of which are pivoted to the levers 12 at 22, so that when the rock-shaft is operated to depress the levers 12 this motion will be transmitted to the plungers 18, for the purpose next explained.

The circumference of the truck-wheels is such that during their forward progression when the planter is in operation the cam-bar will be caused to depress the arm 10 at the proper intervals to deposit the seed at predetermined distances apart, and when this arm is depressed the rock-shaft will be caused to swing the levers 12, which in turn will operate the valves 15, as before described, thereby feeding from the hoppers the amount of grain to be planted at one time to the interior of the posts 17, and this grain will fall by gravity until arrested by the springs 23, upon which it will lie until the downward movement of the plungers 18, brought about by the swinging of the levers 12, causes said plungers to force back the springs against their resiliency, thus permitting the grain to drop from the posts to the ground. The movement of the plungers and valves 15 are so timed that when the former are forcing the grain from off the springs the latter are depositing a further supply of grain from the hopper to the interior of the posts, which will be prevented from passing below the springs by the contact of the plungers therewith, so that when the plungers move upward the grain above the springs will assume the positions previously occupied by the grain just fed to the ground, and this process will continue during the operation of the machine.

24 represents the furrow-openers, which may be of any desired construction, supported by the truck-frame at the front end by attachment of the hangers 25 and at their rear ends by attachment of the posts 17. As is usual, these furrow-openers are bifurcated and flared at their rear ends, so as to embrace said posts, thus giving a free space into which the grain may be dropped to the furrow. The shovel-blades 26 are secured to the lower end of the shank-levers 27, the upper ends of which are pivoted at 28 to the strips 29, secured upon the truck-frame. These blades are normally held down, so as to act upon the ground to scoop up a certain quantity of the soil, by means of the springs 30, and in order that said blades may be elevated out of contact with the ground at predetermined intervals the levers 31 are pivoted at 32 to lugs secured upon the under side of the truck-frame, so that their outer ends project beneath the angled portions of the shank-levers 27, and the inner ends thereof project inward within the field of action of the levers 33, which latter are secured upon the rock-shaft 9 and move in unison therewith. As will be obvious, this arrangement will cause the elevation of the shovel-blades at every operation of the rock-shaft, which also brings about the depositing of the grain within the furrow.

Now it will be obvious that as the planter progresses across the field the shovel-blades will accumulate a certain amount of soil while they are in the ground, and therefore when they are elevated, as before described, this soil will be left in small heaps upon the surface, thus indicating to the eye the point at which the shovel-blades were withdrawn from the ground, and as the positions of these shovel-blades are directly opposite the posts through which the grain is fed to the furrows it will be seen that the location of the grain deposited in the furrows will be prominently indicated. This enables the driver of the planter to determine by casual observation the position of the cross-rows and enables him to line up the dropping of the grain in each successive row with the one last planted. In practice this is of great importance, as it enables the driver to pass around obstructions within the field or over portions thereof in which it is not desired to deposit grain, and yet when desired to again start the planting to bring the cross-rows into alinement.

It is a well-known fact that given distances cannot be accurately laid off upon the surface of the ground by traveling wheels, and therefore it is necessary to put the adjustment of the actuating mechanism, such as the cam-bar 5, within control of the operator or driver, so that from time to time this mechanism may be adjusted to overcome the discrepancies in depositing the grain at given intervals. This is accomplished by the pawl 6, extending outward upon the cam-bar 5 in easy reach of the driver when in that portion of its revolution nearest said driver. Thus when it is necessary to alter the position of the bar 5 upon the drive-shaft 3, so as to retime the planting mechanism relative to the truck-wheels, it is only necessary for the driver to disengage the pawl from the ratchets, when said bar may be moved in the direction of the arrow in Fig. 2, or when it is necessary to move the bar in the opposite direction this is accomplished by simply exerting sufficient force upon said bar in that direction to overcome the friction between the pawl and ratchets. This enables the driver when starting a new row to initially aline up the cross-rows and also to bring the planting mechanism into such time with the wheels as to re-aline the cross-rows at any time they may have lost alinement.

35 represents the tongue, to which the team is to be attached in any convenient manner, and this tongue is pivoted to the front portion of the truck-frame at 36, so as to have a free vertical swinging movement, but is held against lateral movements by the brace-rods 37, stapled at 38 to the front beam of the truck-frame and pivotally bolted at 39 to said tongue. A subtongue 40, consisting of a stout beam of suitable material, is secured at 41 to the under side of the tongue proper and is connected by a link 42 to the lower end of the locking-lever 43, and said lever is pivoted at 44 to the notched segment 45, which latter is supported upon the cross-beam 46 of the truck-frame. The lever 43 is provided with a spring-actuated draw-bolt 47 under control of the hand-lever 48, so that said lever 43 may be locked in any of a number of positions by the shooting of said bolt into one of the notches 49 in the segment. The object of this last-described construction is that the tongue 35 may have a swinging movement to conform to the movements of the team which is attached thereto without affecting the vertical positions of the furrow-openers 24 when the latter are in operation; but when it is desirable to elevate said openers above the ground, so as to prevent their operation, this is accomplished by the swinging of the lever 43 rearward, which will elevate the rear end of the subtongue 40, as shown in dotted lines, Fig. 2, and by a further depression of the lever the said subtongue would come in contact with the tongue 35 and front cross-beam of the truck-frame, thereby rendering the tongue 35 rigid with the frame, and also elevating the front end of the truck-frame sufficiently to raise the furrow-openers above the surface of the ground. When this has been accomplished, the planter may be driven to any portion of the field without operating thereon, or it may be transferred from one field to another or driven along a road without injury to the furrow-openers.

50 is the seat for the accommodation of the driver.

The coil-springs 51 are attached to the truck-frame, and also to the levers 12, for holding the latter in their normal position and permitting their operation when the rock-shaft 9 is moved by the depression of the arm 10.

I am aware that slight modifications might be made in the construction here shown and described without departing from the spirit of my invention, and I therefore do not wish to be limited to these exact details.

Having thus fully described my invention, what I claim as new and useful is—

1. The herein-described combination of the shaft journaled in the frame and supported by wheels, a cam-bar on the shaft, ratchets for confining the bar, a pawl for engaging the ratchet, an arm 10, a rock-shaft journaled to the under side of the frame, feed-hoppers on the frame, valve mechanism for controlling the hopper-openings, levers for operating the valve mechanism, furrow-openers carried by the frame, posts to which the furrow-openers are connected, plungers operating in the posts, connections from the plungers to the levers 12, levers 31 pivoted to the frame, means for actuating the levers, shovel-blades, and means for throwing the furrow-opener into and out of engagement with the ground.

2. In combination with the frame of a planter of the character described, a tongue 35 pivoted thereto, a subtongue 40 pivoted to the tongue 35, a locking-lever 43 pivoted to the frame and connected by a link 42 to said subtongue, whereby the tongue 35 may be left free to swing with the movements of the team without affecting the vertical position of the frame, or may be made rigid with said frame, substantially as and for the purpose set forth.

In testimony whereof I have hereunto affixed my signature in the presence of two subscribing witnesses.

JACOB C. HAAS.

Witnesses:
S. S. WILLIAMSON,
S. J. HAYES.